(12) United States Patent
Matsumoto (10) Patent No.: US 11,103,885 B2
(45) Date of Patent: Aug. 31, 2021

(54) SEALANT DISCHARGING APPARATUS

(71) Applicant: SUBARU CORPORATION, Tokyo (JP)

(72) Inventor: Yohei Matsumoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/589,832

(22) Filed: Oct. 1, 2019

(65) Prior Publication Data

US 2020/0114383 A1 Apr. 16, 2020

(30) Foreign Application Priority Data

Oct. 11, 2018 (JP) .............................. JP2018-192787

(51) Int. Cl.
| | |
|---|---|
| *B05B 12/00* | (2018.01) |
| *B05C 11/10* | (2006.01) |
| *B05C 17/005* | (2006.01) |
| *G01N 35/10* | (2006.01) |

(52) U.S. Cl.
CPC ........ *B05B 12/004* (2013.01); *B05C 11/1013* (2013.01); *B05C 17/005* (2013.01); *G01N 35/1016* (2013.01); *G01N 2035/1018* (2013.01)

(58) Field of Classification Search
None
See application file for complete search history.

(56) References Cited

U.S. PATENT DOCUMENTS

| | | | |
|---|---|---|---|
| 2006/0135907 A1* | 6/2006 | Remde .................. | G01N 29/14 604/67 |
| 2007/0212483 A1 | 9/2007 | Miyashita et al. | |
| 2013/0141484 A1* | 6/2013 | Kasai ..................... | B41J 2/2142 347/14 |
| 2015/0343487 A1 | 12/2015 | Davancens et al. | |
| 2018/0009000 A1 | 1/2018 | Shang et al. | |
| 2018/0029066 A1 | 2/2018 | Hugghins et al. | |
| 2018/0161789 A1 | 6/2018 | Jin | |

FOREIGN PATENT DOCUMENTS

| | | |
|---|---|---|
| EP | 1 406 060 A1 | 4/2004 |
| JP | 7-124509 A | 5/1995 |
| JP | 2007-54727 A | 3/2007 |

OTHER PUBLICATIONS

Extended European Search Report issued in corresponding European Patent Application No. EP 19 20 2416 dated Apr. 1, 2020.

* cited by examiner

*Primary Examiner* — Jethro M. Pence
(74) *Attorney, Agent, or Firm* — Troutman Pepper Hamilton Sanders LLP (57) ABSTRACT

A sealant discharging apparatus includes a sealing gun, a movement controller, a discharge controller, a measuring instrument, and an air bubble detector. The sealing gun is configured to discharge sealant to an object. The movement controller is configured to cause the sealing gun and the object to move relatively. The discharge controller is configured to control a discharge amount of the sealant discharged from the sealing gun. The measuring instrument is configured to measure a distance to a sealant pool that has been discharged from the sealing gun and yet to be used to seal the object. The air bubble detector is configured detect mixture of an air bubble in the sealant discharged from the sealing gun, on a basis of a result of measurement by the measuring instrument.

7 Claims, 7 Drawing Sheets

SEALANT DISCHARGING APPARATUS

CROSS-REFERENCE TO RELATED APPLICATIONS

The present application claims priority from Japanese Patent Application No. 2018-192787 filed on Oct. 11, 2018, the entire contents of which are hereby incorporated by reference.

BACKGROUND

The present disclosure relates to a sealant discharging apparatus.

SUMMARY

An aspect of the present disclosure provides a sealant discharging apparatus including a sealing gun, a movement controller, a discharge controller, a measuring instrument, and an air bubble detector. The sealing gun is configured to discharge sealant to an object. The movement controller is configured to cause the sealing gun and the object to move relatively. The discharge controller is configured to control a discharge amount of the sealant discharged from the sealing gun. The measuring instrument is configured to measure a distance to a sealant pool that has been discharged from the sealing gun and yet to be used to seal the object. The air bubble detector is configured detect mixture of an air bubble in the sealant discharged from the sealing gun, on a basis of a result of measurement by the measuring instrument.

An aspect of the present disclosure provides a sealant discharging apparatus including a sealing gun and circuitry. The sealing gun is configured to discharge sealant to an object. The circuitry is configured to cause the sealing gun and the object to move relatively. The circuitry is configured to control a discharge amount of the sealant discharged from the sealing gun. The circuitry is configured to measure a distance to a sealant pool that has been discharged from the sealing gun and yet to be used to seal the object. The circuitry is configured detect mixture of an air bubble in the sealant discharged from the sealing gun, on a basis of a result of the measurement of the distance to the sealant pool.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

In the following, a preferred but non-limiting embodiment of the disclosure is described in detail with reference to the accompanying drawings. Note that sizes, materials, specific values, and any other factors illustrated in the embodiment are illustrative for easier understanding of the disclosure, and are not intended to limit the scope of the disclosure unless otherwise specifically stated. Further, elements in the following example embodiment which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale.

A sealant discharging apparatus applies sealant stored in a cartridge to an object. In the sealant discharging apparatus, mixture of an air bubble in the sealant is detected by detecting the shape of the sealant applied to the object (see Japanese Unexamined Patent Application Publication (JP-A) No. 2007-54727).

However, in the sealant discharging apparatus described in JP-A No. 2007-54727, when an air bubble enters the sealant applied to the object, the air bubble may not be detected.

It is desirable to provide a sealant discharging apparatus capable of detecting an air bubble mixed in the sealant with high accuracy.

Figure 1:
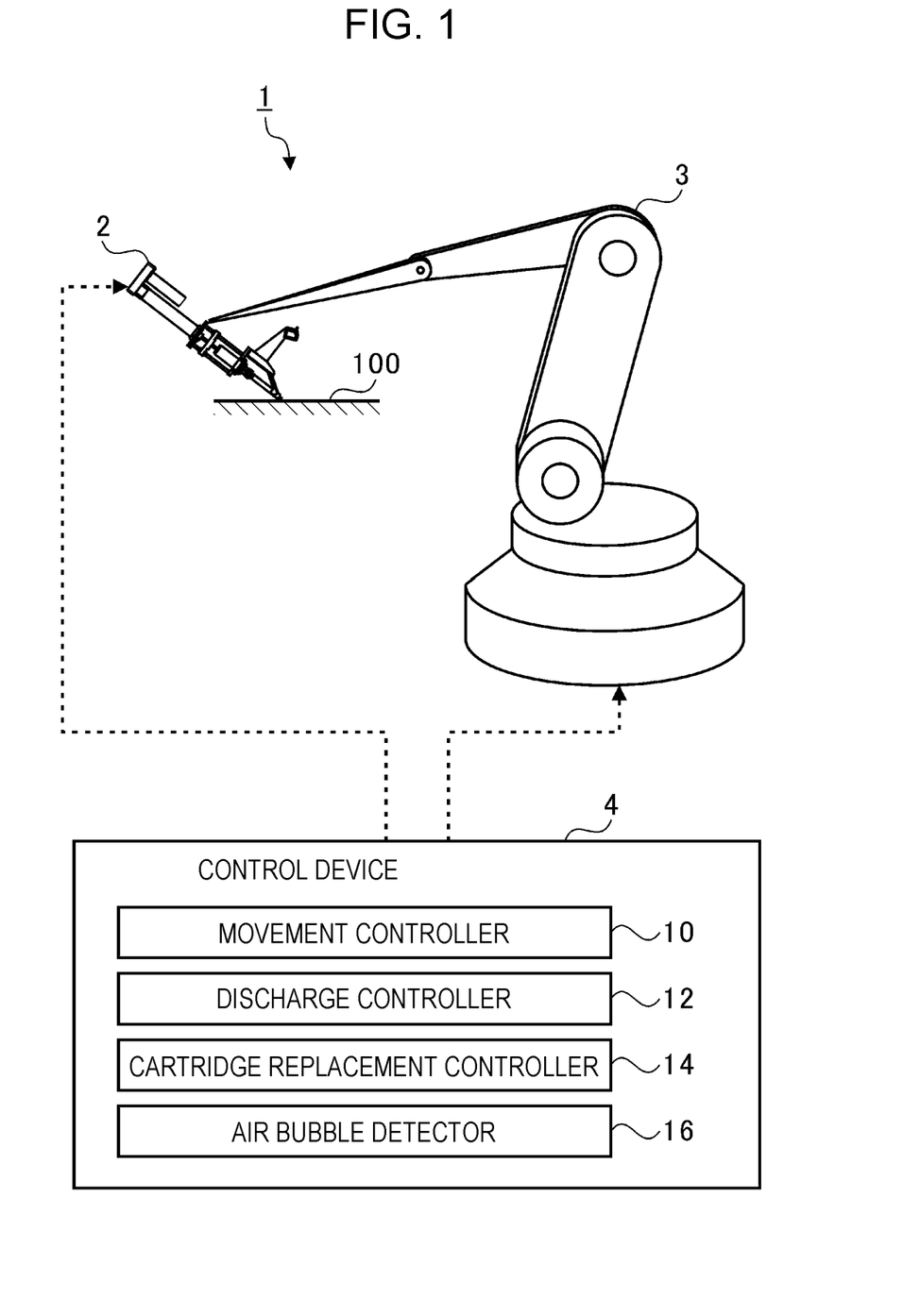
FIG. 1 is a diagram illustrating the configuration of a sealant discharging apparatus.

FIG. 1 is a diagram illustrating the configuration of a sealant discharging apparatus 1. It is to be noted that the flow of a signal is indicated by a dashed arrow in FIG. 1.

As illustrated in FIG. 1, the sealant discharging apparatus 1 includes a sealing gun 2, a robot arm 3, and a control device 4. The sealing gun 2 discharges and applies sealant to an object 100 based on the control of the control device 4. The configuration of the sealing gun 2 will be described in detail later.

The robot arm 3 has multiple joints, and the sealing gun 2 is fixed to the tip end of the robot arm 3. In the robot arm 3, the joints are each provided with an actuator. The robot arm 3 drives each actuator based on the control of the control device 4, thereby moving the sealing gun 2 at any position and velocity.

The control device 4 is implemented by a microcomputer including a central processing unit (CPU), a ROM which stores programs and the like, and a RAM serving as a work area. The control device 4 loads the programs stored in the ROM to the RAM, and executes the programs, thereby serving as a movement controller 10, a discharge controller 12, a cartridge replacement controller 14, and an air bubble detector 16.

The movement controller 10 performs drive control on the actuator provided in each joint of the robot arm 3. Thereby, the robot arm 3 can move the sealing gun 2 at any position and velocity The discharge controller 12 controls the discharge amount of the sealant which is discharged from the sealing gun 2 to the object 100.

When replacing a cartridge 24 (see FIG. 2) of the sealing gun 2, the cartridge replacement controller 14 controls driving of the sealing gun 2 and the robot arm 3.

The air bubble detector 16 detects an air bubble mixed in sealant S discharged from the sealing gun 2.

Figure 2:
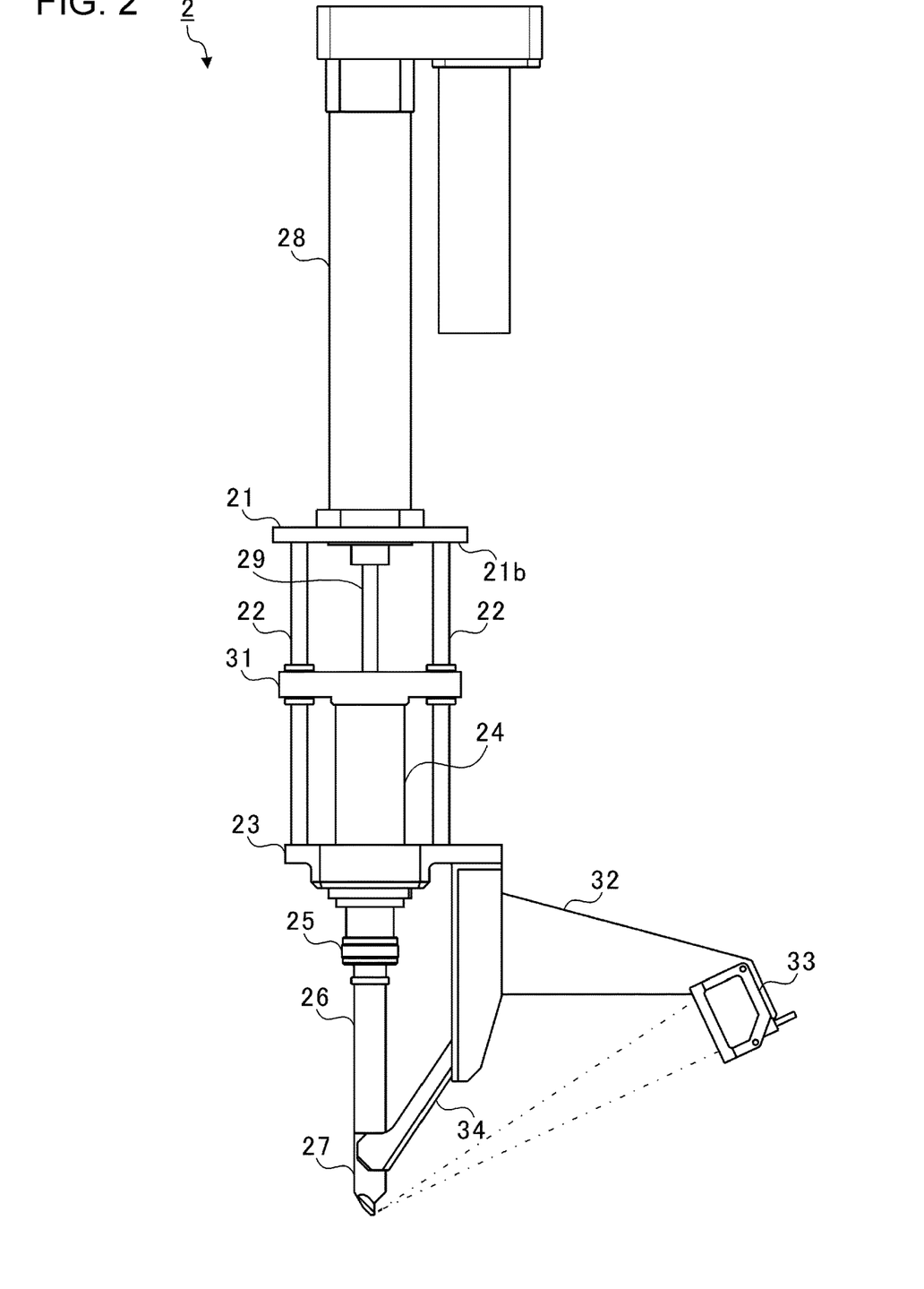
FIG. 2 is a view illustrating the configuration of a sealing gun.
Figure 3:
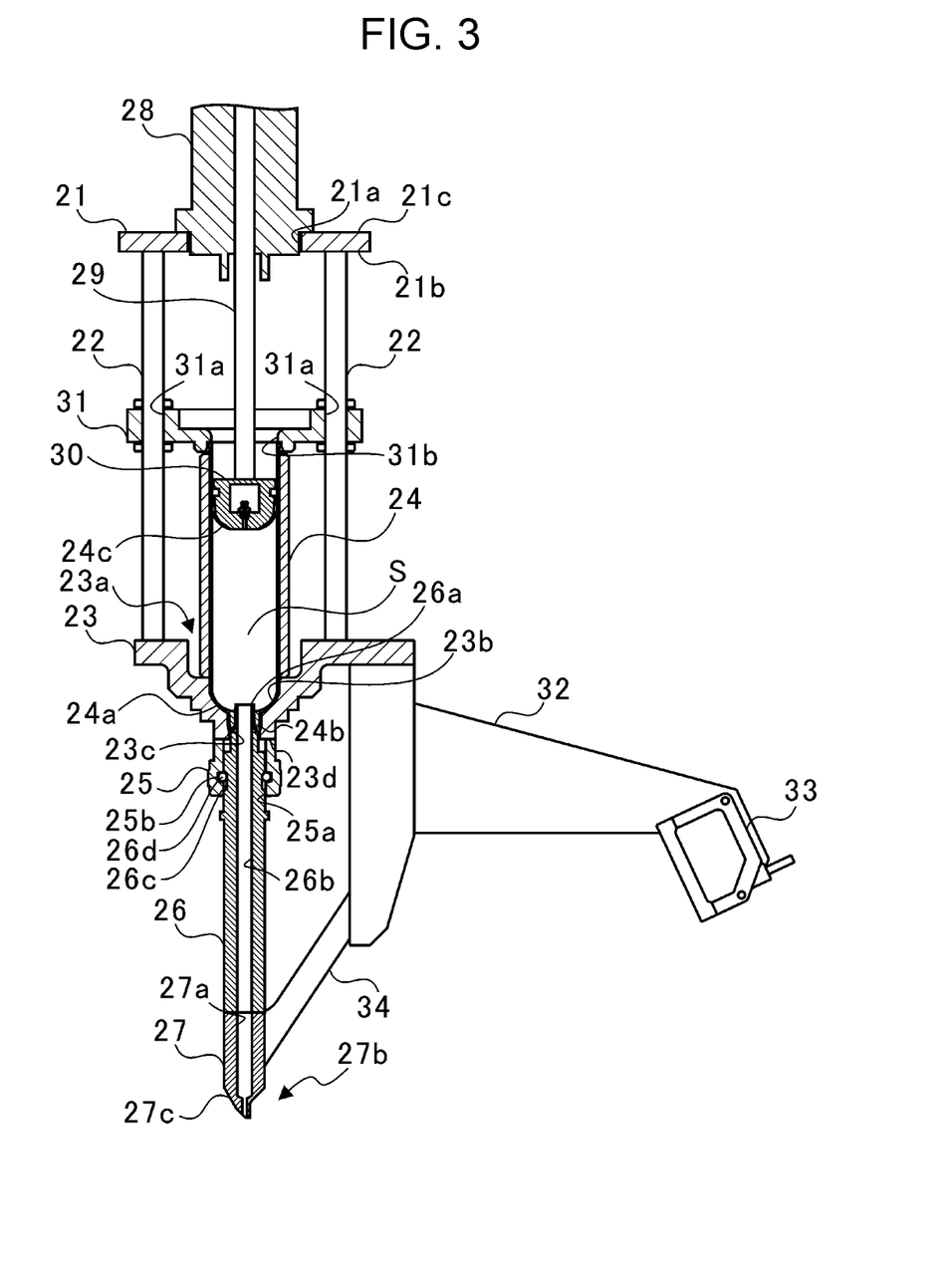
FIG. 3 is a partial cross-sectional view of the sealing gun.

FIG. 2 is a view illustrating the configuration of the sealing gun 2. FIG. 3 is a partial cross-sectional view of the sealing gun 2. It is to be noted that laser emitted from a measuring instrument 33 is illustrated by a dashed-dotted line. In FIG. 3, hatching is applied to each portion indicated by a cross section.

As illustrated in FIGS. 2 and 3, the sealing gun 2 includes a support plate 21, rails 22, a cartridge receiver 23, a cartridge 24, a nozzle chuck 25, a nozzle adapter 26, a nozzle 27, an actuator 28, a rod 29, a pusher 30, and a pressure plate 31.

Hereinafter a description will be given where the direction (the direction in which the nozzle adapter 26, the nozzle 27 are extended) in which the pusher 30 is moved is a sliding direction. A description will be given where in the sliding direction, the direction (the direction from the actuator 28 toward the nozzle 27) in which the pusher 30 is pushed-in is referred to as a tip end direction, the direction (the direction from the nozzle 27 toward the actuator 28) in which the pusher 30 is pulled back is referred to as a terminal end direction.

The support plate 21 is formed in a plate shape extending in a direction perpendicular to the sliding direction. A through hole 21a penetrating in the sliding direction is formed in the center of the support plate 21. The support plate 21 is supported at the tip end of the robot arm 3. In other words, the sealing gun 2 is supported by the robot arm 3 via the support plate 21.

Two rails 22 are fixed to the lower surface 21b of the support plate 21. The two rails 22 are provided at symmetric positions across the through hole 21a on the support plate 21, and extend in the sliding direction.

In the two rails 22, the cartridge receiver 23 is fixed to each end thereof in the sliding direction. A through hole 23a penetrating in the sliding direction is formed in the center of the cartridge receiver 23. The cartridge 24 is inserted in the through hole 23a from the side of the support plate 21.

The cartridge 24 is formed in a circular cylindrical shape, and a tip end 24a is formed in a hemisphere shape. In addition, a projection member 24b projecting in a circular cylindrical shape is formed at the center of the tip end 24a.

The sealant S is stored inside the cartridge 24. A plunger 24c is movably provided in the cartridge 24 in the sliding direction. The sealant S is sealed in the cartridge 24 along with the plunger 24c. The sealant S is, for example, two-liquid mixing sealant which is cured by mixing two different liquid. In the present embodiment, when the sealant S stored in the cartridge 24 is used up, the whole cartridge 24 is designed to be replaced in the sealing gun 2. A general-purpose cartridge is used as the cartridge 24.

The through hole 23a of the cartridge receiver 23 includes a cartridge receive groove 23b which is dented in a hemisphere shape in conformity with the shape of the tip end 24a of the cartridge 24. A first tapered member 23c is formed in the tip end direction at the center of the cartridge receive groove 23b. The shape of the through hole 23a will be described in detail later.

The nozzle chuck 25 is fixed to a lower surface 23d of the cartridge receiver 23. The nozzle chuck 25 includes a through hole 25a penetrating in the sliding direction. The axial center of the through hole 25a is positioned concentrically with the axial center of the through hole 23a of the cartridge receiver 23. The nozzle adapter 26 is inserted in the through hole 25a of the nozzle chuck 25.

The nozzle adapter 26 is formed in a circular cylindrical shape. A terminal end 26a of the nozzle adapter 26 in the terminal end direction is inserted in the projection member 24b of the cartridge 24. The nozzle adapter 26 includes a through hole 26b penetrating in the sliding direction. The through hole 26b communicates with the internal space of the cartridge 24. The shape of the terminal end 26a will be described in detail later.

Multiple ball grooves 25b are formed in the inner wall surface of the through hole 25a of the nozzle chuck 25. Ball grooves 26c are formed on the outer circumferential surface of the nozzle adapter 26 at the positions opposed to the ball grooves 25b of the nozzle chuck 25. The grooves 26c are formed longer than the ball grooves 25b in the sliding direction. Balls 26d are disposed between the ball grooves 25b and the ball grooves 26c. The nozzle adapter 26 is movably supported by the nozzle chuck 25 in the sliding direction via the balls 26d.

The end of the nozzle adapter 26 in the tip end direction is connected with the nozzle 27. The nozzle 27 includes a through hole 27a penetrating in the sliding direction, and is formed in a circular cylindrical shape as a whole. The through hole 27a communicates with the through hole 26b of the nozzle adapter 26.

The nozzle 27 has a tilted surface 27c at a tip end 27b in the tip end direction, the tilted surface 27c being tilted to the sliding direction. The tip end 27b is formed in a V-character shape so that the tip end is notched in two parts.

The actuator 28 is fixed to an upper surface 21c of the support plate 21. The actuator 28 is fixed so that its tip end is inserted in the through hole 21a of the support plate 21. The rod 29 is movably stored inside the actuator 28 in the sliding direction. The actuator 28 is driven based on the control of the discharge controller 12 and the cartridge replacement controller 14, and causes the rod 29 to move in the sliding direction.

The pusher 30 is mounted on the tip end of the rod 29. The pusher 30 is formed in a hemisphere shape with a diameter smaller than the inner diameter of the cartridge 24. The pusher 30 pushes the plunger 24c of the cartridge 24 in the tip end direction along with the movement of the rod 29. Also, space communicating with the tip end side (the plunger 24c side) is formed inside the pusher 30. In the pusher 30, the internally formed space is coupled to a vacuum pump which is not illustrated. The pusher 30 is capable of sucking the plunger 24c by driving the vacuum pump.

The two rails 22 are inserted in the pressure plate 31. The pressure plate 31 is formed in a plate shape extending in a direction perpendicular to the sliding direction. The pressure plate 31 includes a through hole 31a in which the rails 22 are inserted, and is movable along the rails 22. In the pressure plate 31, a through hole 31b is formed in the sliding direction, the through hole 31b having a diameter larger than the outer diameter of the pusher 30 and smaller than the outer diameter of the cartridge 24.

The pressure plate 31 is controlled for movement by the control device 4 via an actuator (not illustrated), and is moved in the tip end direction, thereby holding the cartridge 24 with the cartridge receiver 23.

In the sealing gun 2 having such a configuration, when the pusher 30 is moved in the tip end direction based on the control of the discharge controller 12, the sealant S stored inside the cartridge 24 is pressed via the plunger 24c. Then, the sealant S is discharged, and applied to the object 100 from the tip end 27b of the nozzle 27 by a pressing force of the pusher 30 through the through hole 26b and the through hole 27a.

In addition, the sealing gun 2 is provided with a measuring instrument supporter 32, a measuring instrument 33, and a nozzle supporter 34. The measuring instrument supporter 32 is fixed to the tip end direction side of the cartridge receiver 23. The measuring instrument 33 is fixed to the tip end of the measuring instrument supporter 32.

The measuring instrument 33 is a distance sensor that emits laser as well as receives the emitted laser, thereby making it possible to measure the distance to a position at which the laser is reflected. The measuring instrument 33 emits laser to the tip end 27b of the nozzle 27, more specifically, to the sealant S discharged through the nozzle 27.

The measuring instrument 33 is coupled to the control device 4, and outputs a measurement result to the control device 4. The control device 4 (the discharge controller 12, see FIG. 1) can recognize the discharge amount of the sealant S by receiving the distance to the sealant S (the later-described sealant pool S1) discharged through the nozzle 27.

The nozzle supporter 34 has one end fixed to the measuring instrument supporter 32 and the other end retaining the nozzle 27. Thus the nozzle supporter 34 holds the nozzle 27.

Figure 4:
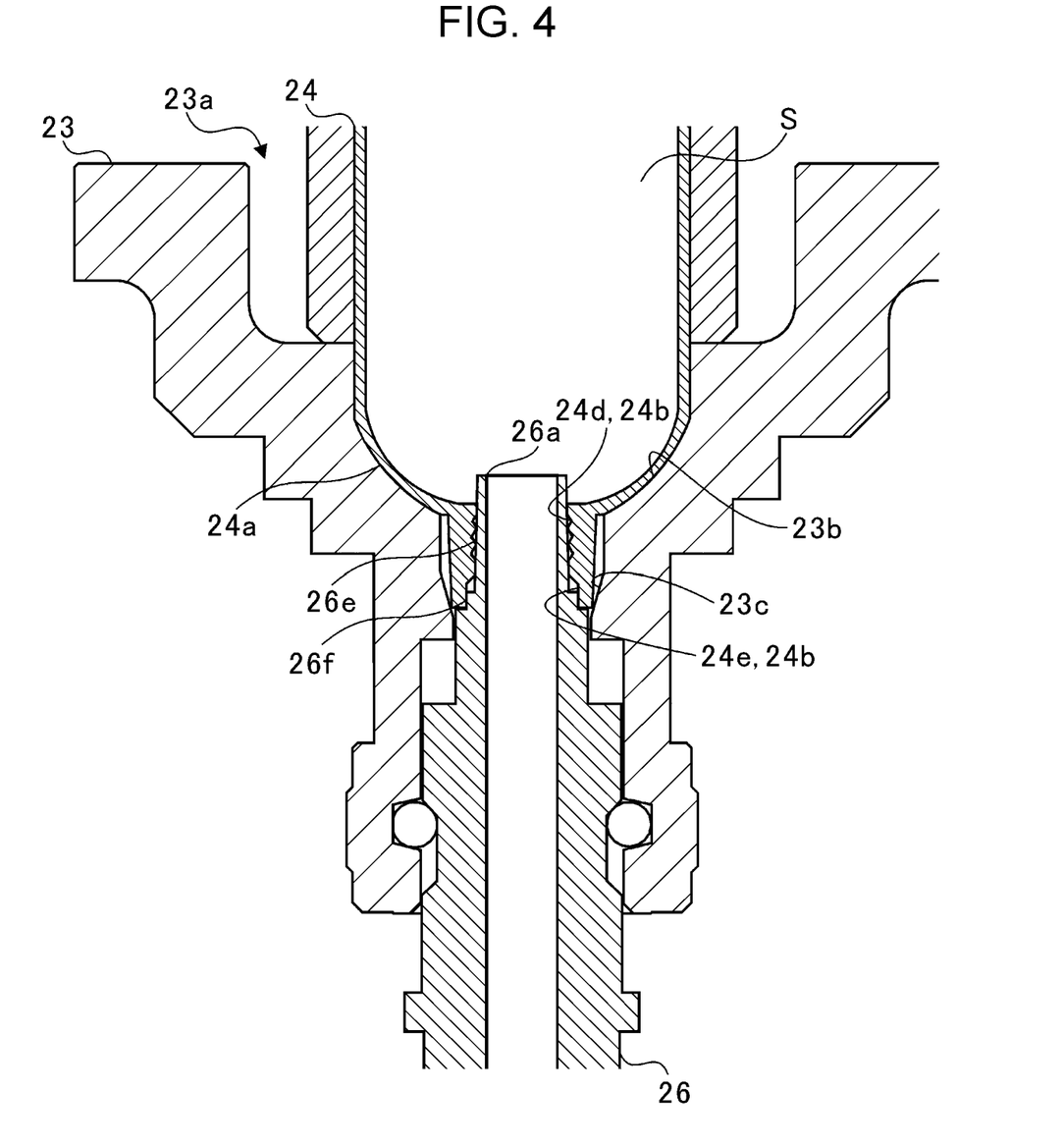
FIG. 4 is a view illustrating the detailed configuration of a cartridge receiver, a cartridge, and a nozzle adapter.

FIG. 4 is a view illustrating the detailed configuration of the cartridge receiver 23, the cartridge 24, and the nozzle adapter 26. In FIG. 4, part of the cartridge receiver 23, the cartridge 24, and the nozzle adapter 26 is illustrated on a large scale.

As illustrated in FIG. 4, the projection member 24b of the cartridge 24 is formed in a tapered shape having a gradually decreasing outer diameter toward the tip end in the sliding direction. In the projection member 24b, the inside penetrating in the sliding direction is divided into a second tapered member 24d and a first large diameter member 24e.

The second tapered member 24d has a gradually increasing inner diameter toward the tip end in the sliding direction, and a thread groove is formed. The first large diameter member 24e is further than the second tapered member 24d in the tip end direction, and is formed to be continuous to the second tapered member 24d.

The first large diameter member 24e is formed to have an inner diameter larger than the inner diameter of the second tapered member 24d at the position continuous to the first large diameter member 24e. The first large diameter member 24e is formed to have the same diameter in the sliding direction.

The terminal end 26a of the nozzle adapter 26 is divided into a third tapered member 26e and a second large diameter member 26f. The third tapered member 26e has a gradually decreasing outer diameter in the terminal end direction of the sliding direction. The taper angle of the third tapered member 26e is equal or substantially equal to the taper angle of the second tapered member 24d of the cartridge 24.

The outer diameter of the most end of the third tapered member 26e in the terminal end direction is smaller than the least inner diameter of the second tapered member 24d. The outer diameter of the most end of the third tapered member 26e in the tip end direction is larger than the greatest inner diameter of the second tapered member 24d. Therefore, when the cartridge 24 is inserted in the nozzle adapter 26, the second tapered member 24d of the cartridge 24 comes into contact with the third tapered member 26e of the nozzle adapter 26. Thus, the cartridge 24 can be easily replaced without screwing down the cartridge 24 in the sealing gun 2. Also, occurrence of leakage of the sealant S between the cartridge 24 and the nozzle adapter 26 when the sealant S is discharged can be reduced without screwing down the cartridge 24.

The second large diameter member 26f is formed to have an outer diameter larger than the outer diameter of the third tapered member 26e at the position continuous to the second large diameter member 26f. In addition, the second large diameter member 26f is formed to have an outer diameter equal or substantially equal to the inner diameter of the first tapered member 24e of the cartridge 24. The second large diameter member 26f is formed to have the same diameter in the sliding direction. Therefore, when the cartridge 24 is inserted in the nozzle adapter 26, the first large diameter member 24e of the cartridge 24 comes into contact with the second large diameter member 26f of the nozzle adapter 26. Consequently, in the sealing gun 2, occurrence of leakage of the sealant S between the cartridge 24 and the nozzle adapter 26 when the sealant S is discharged can be reduced without screwing down the cartridge 24.

The first tapered member 23c of the cartridge receiver 23 has a gradually decreasing inner diameter toward the tip end in the sliding direction. Also, the inner diameter (the greatest inner diameter) of the end of the first tapered member 23c in the terminal end direction is larger than the outer diameter of the end of the projection member 24b of the cartridge 24 in the tip end direction. The inner diameter (the least inner diameter) of the end of the first tapered member 23c in the tip end direction is smaller than the outer diameter of the end of the projection member 24b of the cartridge 24 in the tip end direction. Therefore, when the cartridge 24 is inserted in the nozzle adapter 26, the projection member 24b of the cartridge 24 comes into contact with the first tapered member 23c of the cartridge receiver 23, and a force toward the radially inner side is applied. This causes the first large diameter member 24e of the cartridge 24 to press against the second large diameter member 26f of the nozzle adapter 26, and thus occurrence of leakage of the sealant S between the cartridge 24 and the nozzle adapter 26 can be further reduced.

Figure 5:
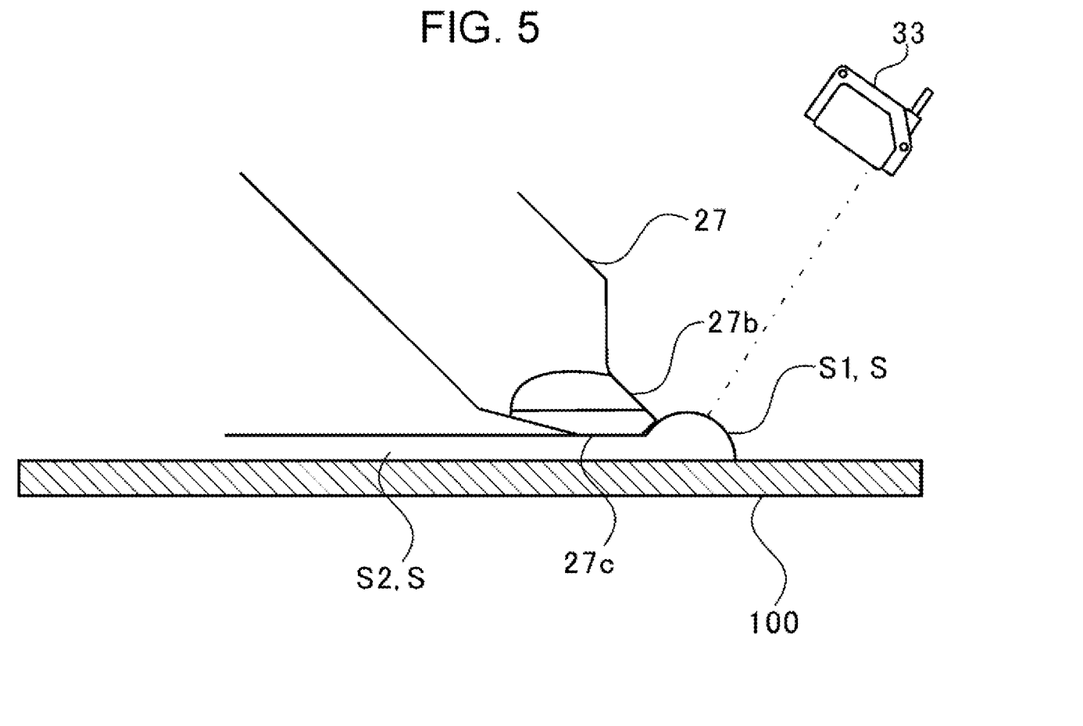
FIG. 5 is a view illustrating the control of movement velocity of the sealing gun.

Hereinafter the control of the movement velocity of the sealing gun 2 will be described. FIG. 5 is a view illustrating the control of movement velocity of the sealing gun 2. As illustrated in FIG. 5, when the sealant S is discharged and applied to the object 100, the movement controller 10 tilts the sealing gun 2 so that the tilted surface 27c of the nozzle 27 is parallel to the object 100.

In addition, the movement controller 10 separates the tilted surface 27c of the nozzle 27 from the object 100 by a predetermined distance (application thickness). Subsequently, the discharge controller 12 drives the actuator 28 to discharge the sealant S through the tip end 27b of the nozzle 27. While the sealant S is being discharged, the movement controller 10 moves the sealing gun 2 in parallel to the object 100 in the direction (the right direction in FIG. 5) in which the sealant S is discharged. In other words, the sealing gun 2 discharges the sealant S forward in the movement direction.

The sealant S discharged from the sealing gun 2 forms a V-character shape such that the tip end 27b of the nozzle 27 is notched, thereby forming the sealant pool S1. Subsequently, the sealant S forming the sealant pool S1 enters the gap between the tilted surface 27c and the object 100 as the sealing gun 2 is moved. Consequently, the sealant S is applied to the object 100 with a uniform thickness, and the object 100 is sealed with the sealant S. Hereinafter the sealant S, with which the object 100 has been sealed, is called post-sealing sealant S2.

While the sealant S is entering the gap between the sealant S and the tilted surface 27c, new sealant S is continued to be discharged from the sealing gun 2. Thus, the sealant pool S1 is continued to be formed all the time.

Here, the viscosity of the sealant S may change in a short time. When the viscosity of the sealant S changes, the discharge amount of the sealant S discharged from the sealing gun 2 is changed provided that the pressing velocity of the pusher 30 is constant. When the movement velocity of the sealing gun 2 is constant, due to the change in the discharge amount of the sealant S, the sealant S may not be applied to the object 100 uniformly.

Thus, the movement controller 10 controls the movement velocity of the sealing gun 2 based on the volume of the post-sealing sealant S2 and the amount of volume change in the sealant pool S1 which is discharged from the sealing gun 2, and with which the object 100 has not been sealed.

Figure 6:
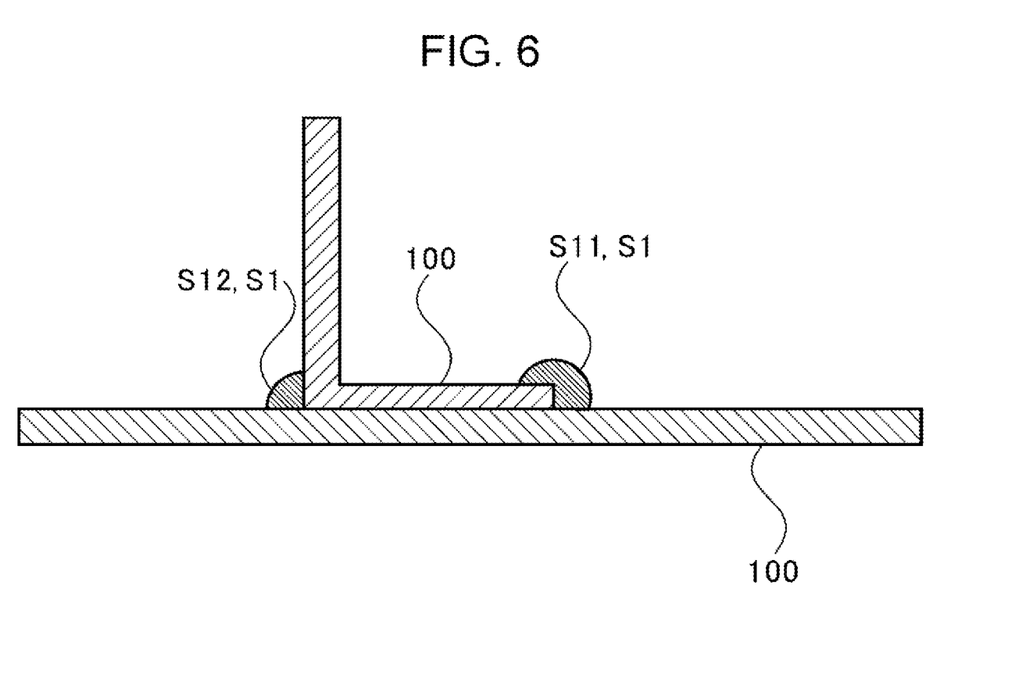
FIG. 6 is a view illustrating the shape of a sealant pool.

FIG. 6 is a view illustrating the shape of the sealant pool S1. As illustrated in FIG. 6, the sealant discharging apparatus 1 may discharge the sealant S (indicated by S11 in FIG. 6) to a joint between two objects 100 which are arranged in parallel. In such a situation, the sealant pool S1 has approximately a hemisphere shape.

The sealant discharging apparatus 1 may discharge the sealant S (indicated by S12 in FIG. 6) to a joint between two objects 100 which are arranged perpendicular to each other. In such a situation, the sealant pool S1 has approximately a quarter sphere shape.

In this manner, the shape of the sealant pool S1 is a hemisphere shape or a quarter sphere shape, thus it is possible to model the shape of the sealant pool S1 by a hemisphere shape or a quarter sphere shape. Hereinafter the case will be described where the shape of the sealant pool S1 is modeled by a hemisphere shape, however, the same method is applicable even when the shape of the sealant pool S1 is modeled by a quarter sphere shape.

When the shape of the sealant pool S1 is modeled by a hemisphere shape, the volume of the post-sealing sealant S2 and the amount of volume change in the sealant pool S1 which is discharged from the sealing gun 2 and with which the object 100 has not been sealed, can be expressed by the Expression (1) based on the relationship of volume conservation.

$$(A \times V \times t) + 0.5 \times 4/3\pi \times rt^3 - 0.5 \times 4/3\pi \times r^3 = D \times t \quad (1)$$

Where A is the cross section of the post-sealing sealant S2, V is the movement velocity of the sealing gun 2, t is the time during which the sealing gun 2 is moved, and the sealant S is discharged, rt is the radius of the sealant pool S1 after t seconds, r is the target radius of the sealant pool S1, and D is the discharge amount of the sealant S per unit time.

In the Expression (1), (A×V×t) is the volume of the post-sealing sealant S2 with which the object 100 is sealed for t seconds. Here, A is a known value.

In the Expression (1), $0.5 \times 4/3\pi \times rt^3 - 0.5 \times 4/3\pi \times r^3$ is the amount of volume change in the sealant pool S1, where r is a predetermined value, and rt is derived based on a measurement result of the measuring instrument 33.

In the Expression (1), D×t is the discharge amount of the sealant S discharged from the sealing gun 2 for t seconds. Specifically, the Expression (1) indicates the relationship that the sum of the volume of the post-sealing sealant S2 and the amount of volume change in the sealant pool S1 gives the discharge amount of the sealant S discharged from the sealing gun 2.

Subsequently, the following Expression (2) can be derived from the Expression (1).

$$V = D/A + (r^3 - rt^3) \times 2/3\pi/A/t \quad (2)$$

In the Expression (2), the movement velocity V of the sealing gun 2 for returning the radius of the sealant pool S1 to the radius r as a target value after t seconds is determined.

The movement controller 10 specifies the movement velocity V of the sealing gun 2 as the value obtained by multiplying a predetermined reference velocity V0 by an override Or (1 to 100%). The reference velocity V0 is set so that when there is no volume change in the sealant pool S1, the override Or is 50%. Therefore, $V = V0 \times Or/100$ and $D/A = 50/100$ are substituted into Expression (2).

Thus, the override Or can be expressed as in Expression (3) below.

$$Or = 50 + A \times (r^3 - rt^3) \times 2/3\pi/A/t/V0 \times 100 \quad (3)$$

The movement controller 10 derives the override Or every t seconds using Expression (3), and controls the movement velocity of the sealing gun 2 based on the derived override Or.

In this manner, the sealant discharging apparatus 1 controls the movement velocity of the sealing gun 2 based on the volume of the post-sealing sealant S2, and the amount of volume change in the sealant pool S1 which is discharged from the sealing gun 2 and with which the object 100 has not been sealed. Consequently, even when the viscosity of the sealant S changes in a short time, the sealant discharging apparatus 1 can stably apply the sealant S to the object 100.

Since the movement controller 10 controls the movement velocity of the sealing gun 2 based on the relationship of volume conservation, specifically, the Expression (1), the discharge amount of the sealant S discharged from the sealing gun 2 can be adjusted with high accuracy.

Also, the calculation load of the movement controller 10 can be reduced by modelling the shape of the sealant pool S1.

Meanwhile, air bubbles may be mixed in the sealant S. Also, when the cartridge 24 is replaced, air bubbles may be mixed into the sealant S. When air bubbles are mixed in the sealant S, if the sealant S is applied to the object 100 as it is, a portion where air bubbles are present has a less thickness of the sealant S (hollow occurs), and the sealing performance of the sealant S may be degraded.

Thus, the air bubble detector 16 detects whether an air bubble is mixed in the sealant S discharged from the sealing gun 2, in other words, detects the presence or absence of an air bubble.

Figure 7:
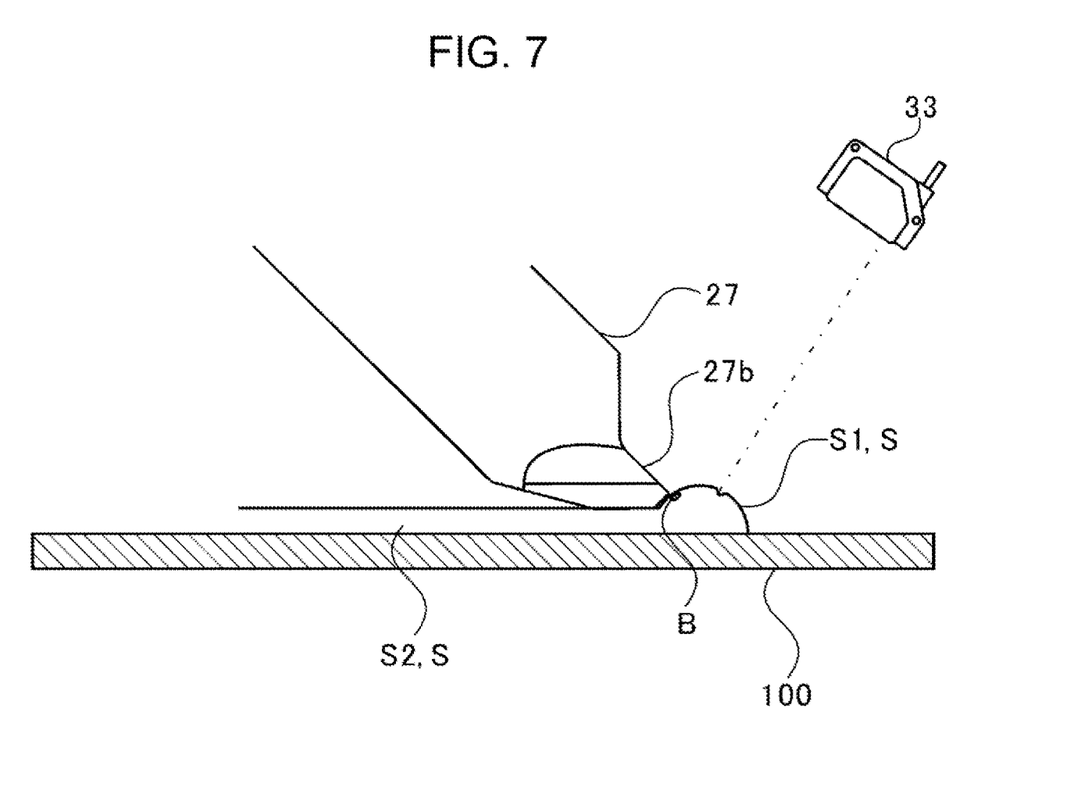
FIG. 7 is a view illustrating the manner in which an air bubble is mixed in the sealant.

FIG. 7 is a view illustrating the manner in which an air bubble B is mixed in the sealant S. Here, in the present embodiment, the through hole 27a of the nozzle 27 is formed such that the cross section is changed from a circular cross section to a rectangular cross section in the tip end direction, thus when the air bubble B is mixed in the sealant S discharged from the sealing gun 2, the air bubble B is made closer to the axial center. Since the tip end 27b of the nozzle 27 is formed in a V-character shape, when the air bubble B made closer to the axial center is discharged through the nozzle 27, the air bubble B is discharged along the central ridge line (the surface side) of the sealant pool S1.

Thus, when the air bubble B is mixed in the sealant S, the air bubble B is discharged near the surface of the sealant pool S1. When the air bubble B is discharged near the surface of the sealant pool S1, the portion where the air bubble B is present in the sealant pool S1 is dented. Thus, the air bubble detector 16 detects the presence or absence of the air bubble B based on the result of detection by the measuring instrument 33.

Figure 8A:
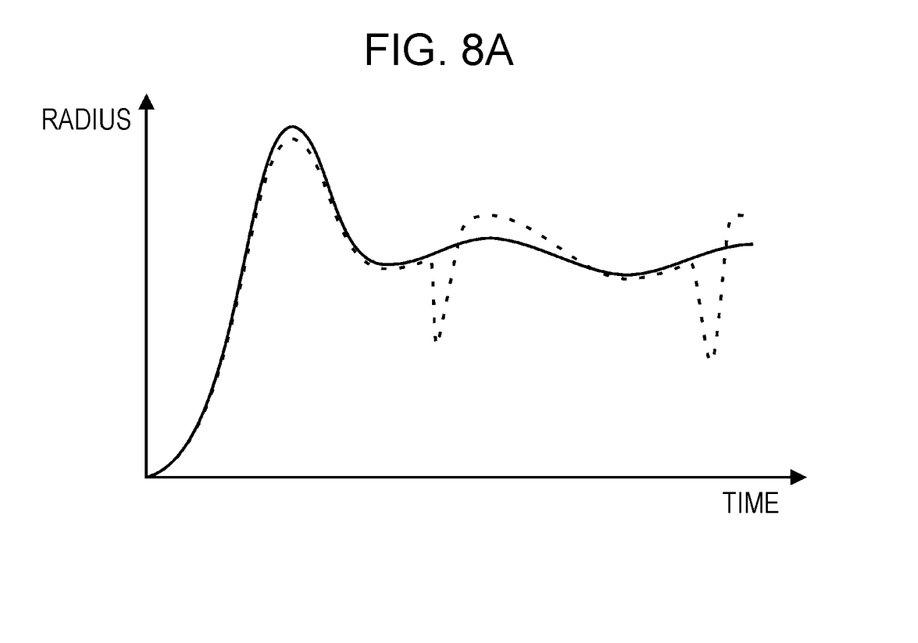
FIGS. 8A and 8B are each a graph illustrating a result of measurement by a measuring instrument with the presence and absence of an air bubble.
Figure 8B:
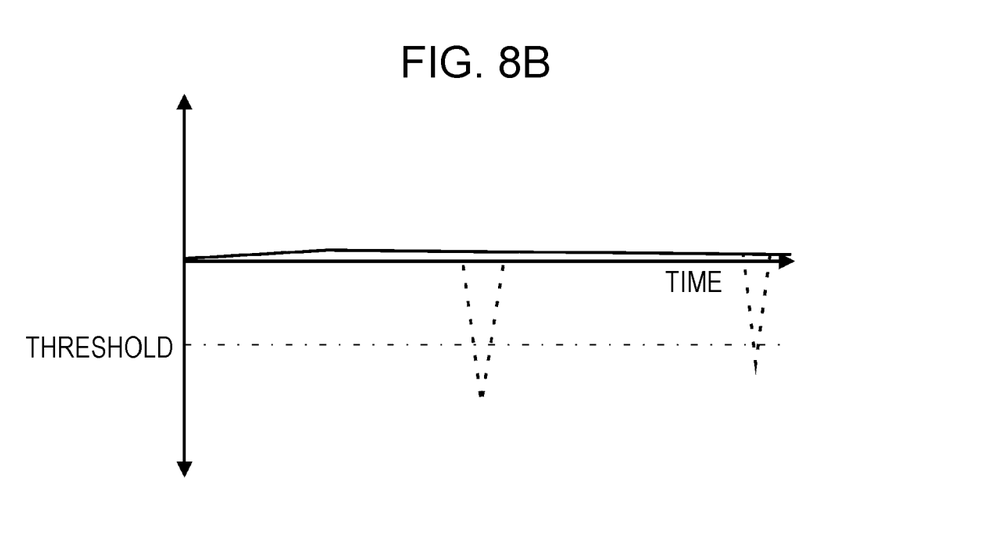

FIGS. 8A and 8B are each a graph illustrating a result of measurement by the measuring instrument 33 with the presence and absence of the air bubble B. In FIGS. 8A and 8B, the case where the air bubble B is absent is illustrated by a solid line, and the case where the air bubble B is present is illustrated by a dashed line. As illustrated in FIG. 8A, when the air bubble B is not mixed in the sealant S, the radius of the sealant pool S1 gradually changes. On the other hand, when the air bubble B is mixed in the sealant S, the radius of the sealant pool S1 suddenly changes at the position where the air bubble B is mixed.

The air bubble detector 16 performs high-pass filter processing on the result of detection by the measuring instrument 33. It is to be noted that in the high-pass filter processing, analog filter, FFT and the like are applied. As illustrated in FIG. 8B, when a value on which the high-pass filter processing has been performed is less than or equal to a predetermined threshold, the air bubble detector 16 determines that the air bubble B is mixed in the sealant S.

When the air bubble B is determined to be mixed in the sealant S by the air bubble detector 16, the movement controller 10 stops the movement of the sealing gun 2, and the discharge controller 12 stops the driving of the actuator 28. However, the processing to be performed when the air bubble B is determined to be mixed in the sealant S by the air bubble detector 16 is not limited to this. For example, the movement controller 10 may output the position where the air bubble B detected by the air bubble detector 16 is mixed in the sealant S. Alternatively, when the air bubble B is determined to be mixed in the sealant S, the air bubble detector 16 may output a signal indicating an error.

In this manner, in the sealant discharging apparatus 1, whether the air bubble B is mixed in the sealant S is determined based on the distance to the sealant pool S1 which is discharged from the sealing gun 2 and with which the object 100 has not been sealed. Thus, whether the air bubble B is mixed in the sealant S can be directly detected before the object 100 is sealed with the sealant S. Consequently, the sealant discharging apparatus 1 can detect the air bubble B mixed in the sealant S with high accuracy.

Although a preferred embodiment of the disclosure has been described above with reference to the accompanying drawings, it is needless to state that the disclosure is not limited to the preferred embodiment. It is apparent that various modifications and alterations will occur to those skilled in the art within the scope of the appended claims, and it is be understood that those modifications and alterations naturally fall within the technical scope of the disclosure.

In the aforementioned embodiment, the case has been described where the nozzle adapter 26 and the nozzle 27 are separately provided. However, the nozzle adapter 26 and the nozzle 27 may be permanently affixed as a nozzle member.

In the aforementioned embodiment, the movement controller 10 controls the movement of the sealing gun 2. However, the movement controller 10 may allow the sealing gun 2 and the object 100 to move relatively. For example, the movement controller 10 may control the movement of the object 100.

The invention claimed is:

1. A sealant discharging apparatus comprising:
   a sealing gun configured to discharge sealant to an object;
   a movement controller configured to cause the sealing gun and the object to move relatively;
   a discharge controller configured to control a discharge amount of the sealant discharged from the sealing gun;
   a measuring instrument configured to measure a distance to a sealant pool that has been discharged from the sealing gun and is yet to be used to seal the object; and
   an air bubble detector configured to determine a radius of the sealant pool based on a result of measurement by the measuring instrument, and detect mixture of an air bubble in the sealant discharged from the sealing gun, on a basis of the determined radius of the sealant pool.

2. The sealant discharging apparatus according to claim 1, wherein the air bubble detector performs high-pass filtering on the result of measurement by the measuring instrument, and detects mixture of an air bubble in the sealant discharged from the sealing gun, on a basis of a value on which the high-pass filtering has been performed.

3. The sealant discharging apparatus according to claim 2, wherein when the value on which the high-pass filtering has been performed is less than or equal to a predetermined threshold, the air bubble detector determines that an air bubble is mixed in the sealant discharged from the sealing gun.

4. The sealant discharging apparatus according to claim 1, wherein the sealing gun discharges the sealant forward in a movement direction.

5. The sealant discharging apparatus according to claim 2, wherein the sealing gun discharges the sealant forward in a movement direction.

6. The sealant discharging apparatus according to claim 3, wherein the sealing gun discharges the sealant forward in a movement direction.

7. The sealant discharging apparatus according to claim 1, wherein the movement controller is configured to control a movement velocity of the sealing gun based on a volume of a post-sealing sealant and an amount of volume change in the sealant pool that has been discharged from the sealing gun and is yet to be used to seal the object.

* * * * *